A. KINGSBURY.
ROTOR FOR DYNAMO ELECTRIC MACHINES.
APPLICATION FILED JULY 13, 1910.

1,162,493.

Patented Nov. 30, 1915.
2 SHEETS—SHEET 1.

WITNESSES:

INVENTOR
Albert Kingsbury
BY
ATTORNEY

A. KINGSBURY.
ROTOR FOR DYNAMO ELECTRIC MACHINES.
APPLICATION FILED JULY 13, 1910.

1,162,493.

Patented Nov. 30, 1915.
2 SHEETS—SHEET 2.

WITNESSES:

INVENTOR
Albert Kingsbury
BY
ATTORNEY

UNITED STATES PATENT OFFICE.

ALBERT KINGSBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

ROTOR FOR DYNAMO-ELECTRIC MACHINES.

1,162,493.  Specification of Letters Patent.  Patented Nov. 30, 1915.

Application filed July 13, 1910. Serial No. 571,802.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Rotors for Dynamo-Electric Machines, of which the following is a specification.

My invention relates to the rotating parts of dynamo-electric machines and particularly to such parts of relatively large machines which are usually provided with a steel spider, to which magnetizable core members are secured.

The object of my invention is to provide a simple and durable substitute for the usual spider which shall be very much stronger than those heretofore used for the same weight and cost of material employed, or, in other words, a structure by the use of which the cost and weight of a large size or high speed rotor may be materially reduced.

My invention is illustrated in the accompanying drawings in which—

Figure 1:
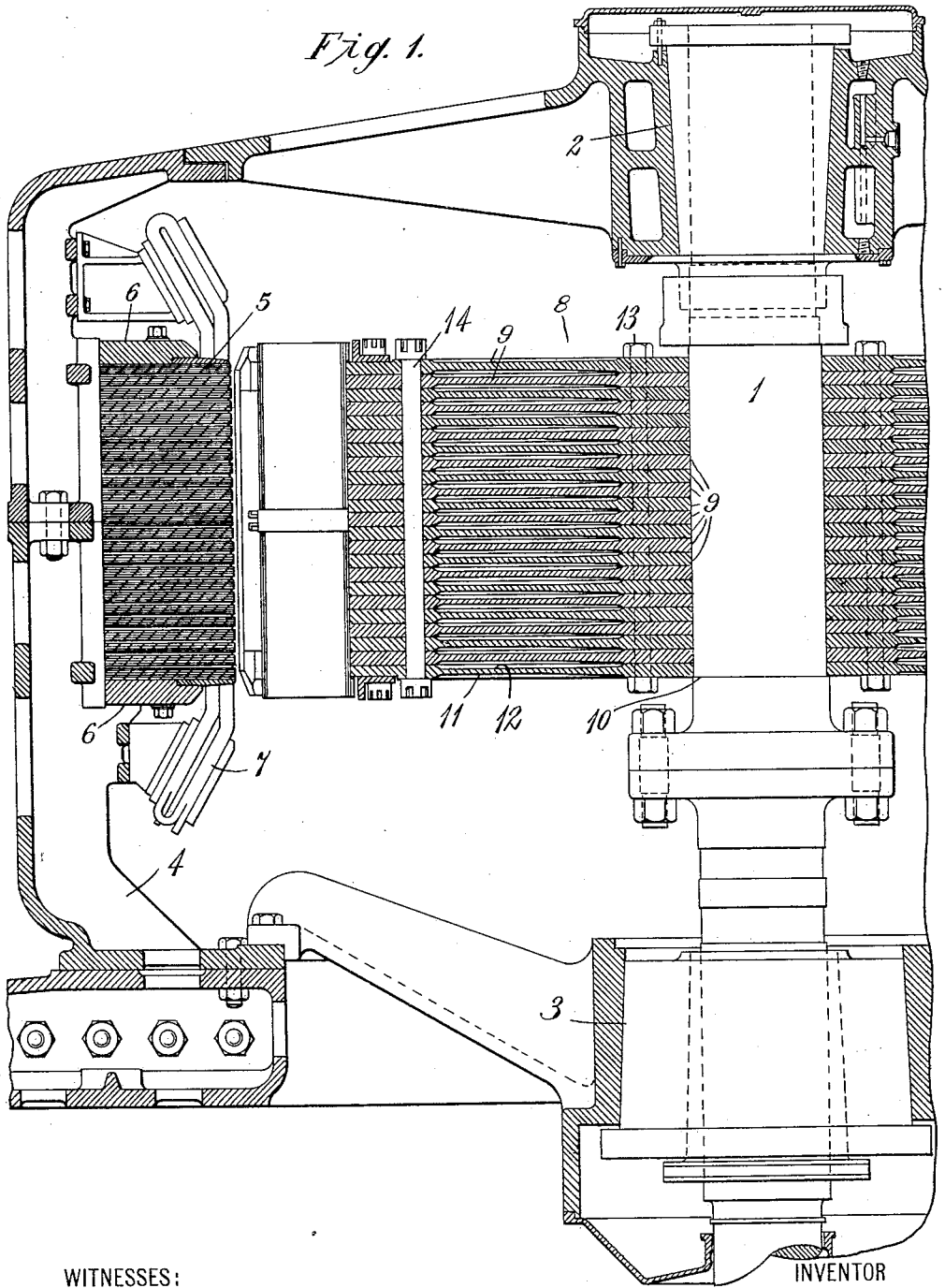
Figure 2:
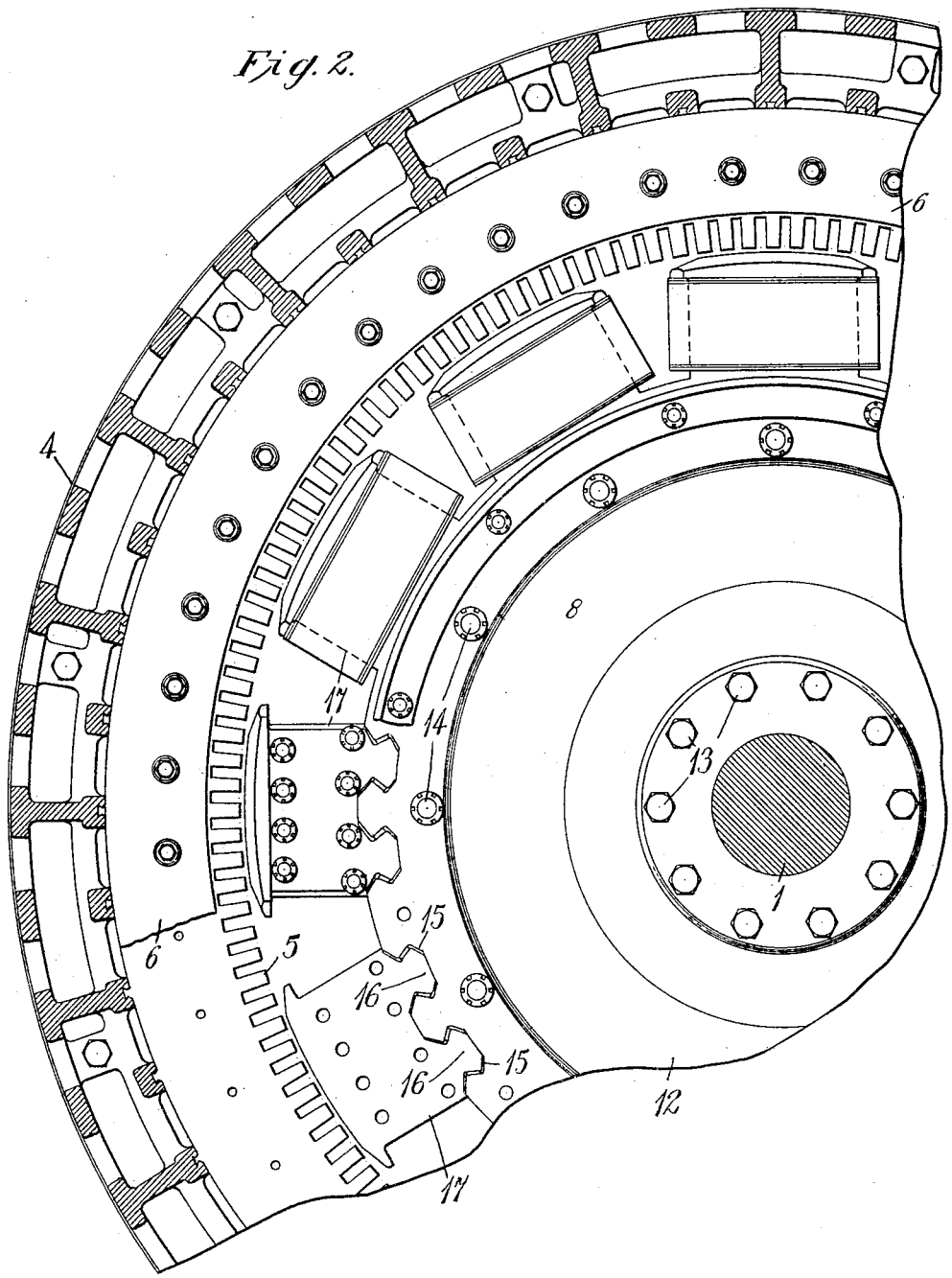

Figure 1 is a sectional elevation of a dynamo-electric machine constructed in accordance therewith, and Fig. 2 is a partially sectional plan view of the machine shown in Fig. 1.

Referring to the drawings, the dynamo-electric machine here shown is of the vertical type, although my invention may be applied to machines having a horizontal shaft, and comprises a vertical shaft 1, guide bearings 2 and 3 therefor, a stationary frame 4, a magnetizable core member 5 secured thereto and held in position by means of end plates 6, an armature winding 7 for the stationary member and a rotor 8.

The rotor comprises a plurality of thin steel disks 9 which are mounted side-by-side on the shaft 1, the bottom disk resting against a shoulder 10 thereon. The opposite faces of each disk are provided with shallow annular grooves 11 and 12 and the widths of which are approximately equal to half the distance between the shaft and the outer circumference of the disks. The shallowest portions of the grooves are nearest to the shaft and the deepest portions are farthest from the shaft, so that the web has a tapering section, as shown in Fig. 1.

The disks are clamped together by bolts 13 and 14 which extend through all the disks and are respectively located close to the shaft and near the circumference of the disks. The grooves 11 and 12 materially reduce the weight of the rotor, and at the same time equalize the stresses throughout the disks.

The outer edges of the assembled disks are provided with dove-tailed grooves 15 which receive dove-tailed projections 16 of pole pieces 17, that are disposed in the usual manner about the circumference of the rotor.

The pole pieces may be secured to the outer surface of the disks in any suitable manner and it is evident that my invention is adapted for use with dynamo-electric machines of various types and may, in fact, be utilized in the construction of fly wheels and other devices for which spiders have heretofore been employed.

I claim as my invention:

1. A rotor for a dynamo-electric machine comprising a shaft, a plurality of thin metal disks assembled side-by-side thereon and having shallow annular grooves in their opposite faces, the widths of which are approximately equal to one half the distance between the shaft and the disk peripheries, and radially disposed magnetizable pole pieces secured to the outer edges of said disks.

2. A rotor for a dynamo-electric machine comprising a shaft, a plurality of thin steel disks assembled side-by-side thereon and provided with shallow annular grooves between their inner and their outer edges, and magnetizable pole pieces secured to, and projecting radially outward from, the outer surface of the assembled disks.

3. A rotor for a dynamo-electric machine comprising a plurality of thin disks having shallow annular grooves of progressively increasing depth from their inner to their outer circumference to equalize the stresses throughout each disk.

4. A rotor comprising a shaft, a plurality of thin metal disks assembled thereon side-by-side and having shallow annular grooves of progressively increasing depth outwardly to reduce the sectional area and the weight and to equalize the stresses throughout each disk.

In testimony whereof, I have hereunto subscribed my name this 7th day of July, 1910.

ALBERT KINGSBURY.

Witnesses:
BERTRAND P. ROWE,
B. B. HINES.